(12) United States Patent
Jung et al.

(10) Patent No.: US 9,408,137 B2
(45) Date of Patent: Aug. 2, 2016

(54) DISCOVERY SIGNAL TRANSMITTED IN DIRECT COMMUNICATION SYSTEM, AND METHOD OF TRANSMITTING/RECEIVING THE DISCOVERY SIGNAL

(71) Applicant: Electronics and Telecommunications Research Institute, Daejeon (KR)

(72) Inventors: Soojung Jung, Daejeon (KR); Sung Kyung Kim, Daejeon (KR); Seungkwon Cho, Gyeonggi-do (KR); Chanho Yoon, Daejeon (KR); Hyung Jin Kim, Daejeon (KR); Sung Cheol Chang, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 140 days.

(21) Appl. No.: 14/058,894

(22) Filed: Oct. 21, 2013

(65) Prior Publication Data

US 2014/0112235 A1    Apr. 24, 2014

(30) Foreign Application Priority Data

| Oct. 22, 2012 | (KR) | ........................ 10-2012-0117487 |
| Jan. 28, 2013 | (KR) | ........................ 10-2013-0009316 |
| Oct. 2, 2013 | (KR) | ........................ 10-2013-0118041 |

(51) Int. Cl.
*H04W 48/16* (2009.01)
*H04W 4/06* (2009.01)
*H04W 76/02* (2009.01)

(52) U.S. Cl.
CPC ................ *H04W 48/16* (2013.01); *H04W 4/06* (2013.01); *H04W 76/023* (2013.01)

(58) Field of Classification Search
CPC . H04W 8/005; H04W 72/005; H04W 72/044; H04W 88/02; H04W 76/02
See application file for complete search history.

(56) References Cited

U.S. PATENT DOCUMENTS

| 2009/0327391 | A1* | 12/2009 | Park et al. ..................... 709/201 |
| 2012/0163278 | A1  | 6/2012  | Chang et al. |
| 2013/0122893 | A1* | 5/2013  | Turtinen et al. ............... 455/423 |
| 2013/0148566 | A1* | 6/2013  | Doppler et al. ............... 370/312 |
| 2013/0155962 | A1* | 6/2013  | Hakola et al. ................ 370/329 |
| 2013/0170470 | A1* | 7/2013  | Kneckt et al. ................. 370/330 |
| 2014/0293861 | A1* | 10/2014 | Kim et al. ..................... 370/312 |
| 2014/0314065 | A1* | 10/2014 | Song et al. .................... 370/338 |

FOREIGN PATENT DOCUMENTS

| KR | 10-2012-0073145 A | 7/2012 |
| KR | 10-2012-0074255 A | 7/2012 |

* cited by examiner

*Primary Examiner* — Pao Sinkantarakorn
*Assistant Examiner* — Stephen Steiner
(74) *Attorney, Agent, or Firm* — Rabin & Berdo, P.C.

(57) ABSTRACT

A discovery signal that a first device joining in direct communication broadcasts through a radio channel is provided. The discovery signal includes a first field representing whether the discovery signal is a signal for discovering a device or a signal for discovering a service, and a second field including one of device identifier information of the first device and service information of a service that the first device provides according to a value of the first field.

16 Claims, 6 Drawing Sheets

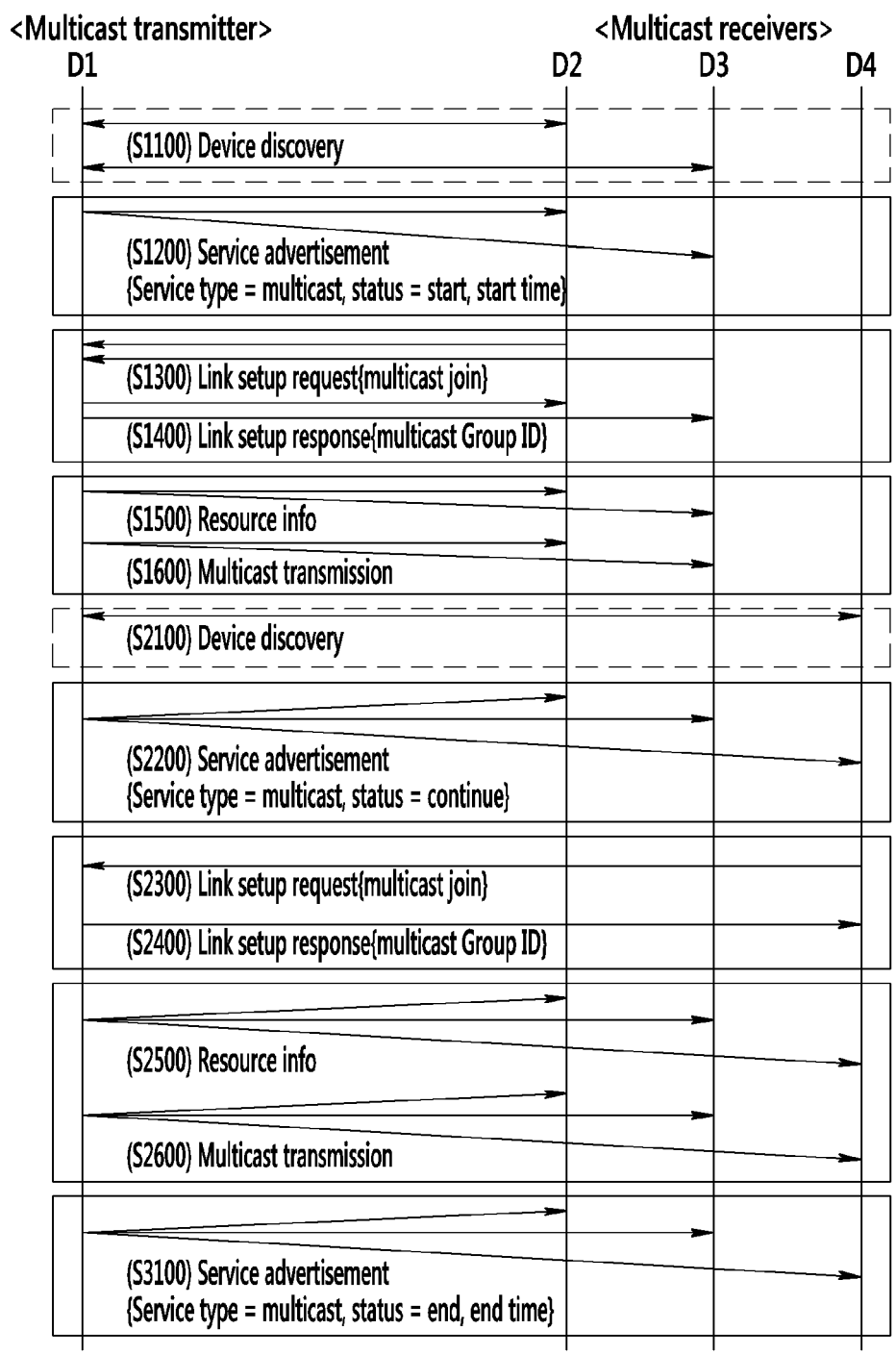

DISCOVERY SIGNAL TRANSMITTED IN DIRECT COMMUNICATION SYSTEM, AND METHOD OF TRANSMITTING/RECEIVING THE DISCOVERY SIGNAL

CROSS-REFERENCE TO RELATED APPLICATION

This application claims priority to and the benefit of Korean Patent Application No. 10-2012-0117487, 10-2013-0009316, and 10-2013-0118041 filed in the Korean Intellectual Property Office on Oct. 22, 2012, Jan. 28, 2013, and Oct. 2, 2013, the entire contents of which are incorporated herein by reference.

BACKGROUND OF THE INVENTION (a) Field of the Invention

The present invention relates to a discovery signal that is transmitted in a device to device (D2D) direct communication system, and a method of transmitting/receiving the discovery signal.

(b) Description of the Related Art

Device to device (D2D) direct communication between mobile terminals may be classified into a discovery step of identifying (discovering) an adjacent terminal periodically existing at a periphery for device to device direct communication between terminals, and a step of setting a communication path between identified (discovered) adjacent terminals and of performing direct communication through the set path.

The step of identifying (discovering) an adjacent terminal may be divided into a step of acquiring terminal identifier information and a step of acquiring service related information that a terminal provides. For this purpose, terminals joining in device to device direct communication between mobile terminals (D2D communication) periodically broadcast terminal identifier information thereof or service information. Because an amount of radio resources necessary for broadcasting identifier information of a terminal is relatively small, overhead according to periodic broadcasting through a radio channel is relatively large. However, when at least one service is provided by a terminal, to periodically broadcast all information about the at least one provided service has high overhead and has effectiveness of a lower amount of radio resources, compared with high overhead. Therefore, service information of an existing adjacent terminal is not broadcasted through a radio channel, and terminal identifier information that is generally broadcasted through a radio channel is acquired and is provided through a communication path that is set after a communication path between adjacent terminals is set. Because such a method can negotiate a service after a communication path is set regardless of whether a communication service is actually provided between terminals, an unnecessary direct communication path may be set between adjacent terminals.

SUMMARY OF THE INVENTION

The present invention has been made in an effort to provide a method having advantages of efficiently discovering a service before setting a direct communication path on a radio channel.

An exemplary embodiment of the present invention provides a discovery signal in which a first device joining in direct communication broadcasts through a radio channel. The discovery signal includes a first field representing whether the discovery signal is a signal for discovering a device or a signal for discovering a service, and a second field including one of device identifier information (Device ID) of the first device and service information of a service that the first device provides according to a value of the first field.

The service information may include service type information representing a type of the service, service identifier information of the service, service status information representing a providing status of the service, and time information that is related to the service status information.

The service type information may represent one of unicast transmission, multicast transmission, and broadcast transmission.

The service status information may represent one of a start status of the service, a continue status of the service, and an end status of the service, and the time information may represent a start time of the service, wherein the service status information represents the start status, and the time information may represent an end time of the service when the service status information represents the end status.

Another embodiment of the present invention provides a method in which a first device joining in device to device direct communication transmits a discovery signal. The method includes: transmitting a first discovery signal for discovering a device, and transmitting a second discovery signal for discovering a service. The first discovery signal includes a first field representing whether the first discovery signal is a signal for discovering a device or a signal for discovering a service, and a second field including one of Device ID of the first device and service information of a service that the first device provides according to a value of the first field. The second discovery signal is formed in the same format as that of the first discovery signal.

The method may further include selecting a first resource for transmitting the first and second discovery signals from among a plurality of resources, before the transmitting of a first discovery signal.

the plurality of resources are provided periodically, and a position of the selected first resource in each period is constant.

The transmitting of a first discovery signal may include periodically broadcasting the first discovery signal N times (N is a natural number) using the selected first resource. The transmitting of a second discovery signal may include periodically broadcasting the second discovery signal M times (M is a natural number) using the selected first resource after the first discovery signal is broadcasted N times.

The selected first resource may be a resource of a determined position according to a hopping pattern. The transmitting of a first discovery signal may include broadcasting the first discovery signal using the selected first resource. The transmitting of a second discovery signal may include broadcasting the second discovery signal using the selected first resource.

The transmitting of a second discovery signal may include periodically broadcasting the second discovery signal M times (M is a natural number) using the selected first resource after the first discovery signal periodically broadcasts N times (N is a natural number). The N and the M may be varied.

The transmitting of a second discovery signal may include masking the service information using the Device ID, inserting the masked service information into the second field, and broadcasting the second discovery signal.

The broadcasting of the second discovery signal may include broadcasting the second discovery signal through a radio channel using a discovery resource for transmitting the first and second discovery signals.

The first device may operate in an ultraframe structure that is formed with a plurality of superframes. A discovery resource may be provided through F (F is a natural number) frames within the ultraframe.

The F frames may each include a plurality of discovery resources.

The plurality of discovery resources may each correspond to any one resource class of K (K is a natural number) resource classes having different cycles.

The method may further include selecting any one discovery resource for transmitting the first and second discovery signals from among the plurality of discovery resources, before the transmitting of a first discovery signal. A plurality of discovery resources that are included in a first frame of the F frames may correspond to a first resource class having a first cycle. A plurality of discovery resources that are included in a second frame of the F frames may correspond to a second resource class having a second cycle.

Yet another embodiment of the present invention provides a method in which a first device joining in direct communication receives a discovery signal. The method includes: receiving the discovery signal; determining whether the discovery signal is a signal for discovering a device or a signal for discovering a service based on a value that is stored at a first field of the received discovery signal; acquiring, when the discovery signal is a signal for discovering a device, Device ID that is stored at a second field of the discovery signal; and acquiring, when the discovery signal is a signal for discovering a service, service information that is stored at the second field of the discovery signal. The discovery signal includes the first field representing whether the discovery signal is a signal for discovering a device or a signal for discovering a service, and the second field including one of the Device ID of a device that transmits the discovery signal and the service information of a service that a device that transmits the discovery signal provides according to a value of the first field.

The method may further include unmasking the acquired service information using the acquired Device ID.

BRIEF DESCRIPTION OF THE DRAWINGS

FIG. 7 is a diagram illustrating a multicast service providing process according to an exemplary embodiment of the present invention.

DETAILED DESCRIPTION OF THE EMBODIMENTS

Figure 1:
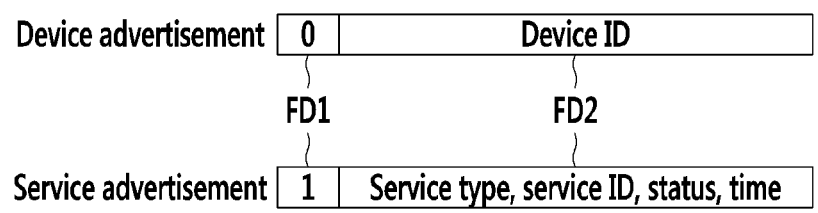
FIG. 1 is a diagram illustrating a structure of a discovery signal according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal or a device may indicate a mobile station (MS), a mobile terminal (MT), an advanced mobile station (AMS), a high reliability mobile station (HR-MS), a subscriber station (SS), a portable subscriber station (PSS), an access terminal (AT), and user equipment (UE), and may include an entire function or a partial function of the terminal, the MT, the AMS, the HR-MS, the SS, the PSS, the AT, and the UE.

The present invention relates to a discovery procedure and method that identify (discover) adjacent terminals by recognizing that adjacent terminals are adjacent in a device to device direct communication system between wideband-based mobile terminals. More specifically, the present invention relates to a discovery method in which terminals broadcast information thereof and in which adjacent terminals receive the information and that identify (discover) information about adjacency and a service that can be provided in device to device direct communication between terminals that support device to device direct communication between a plurality of terminals in a wideband mobile wireless access-based system. Hereinafter, a configuration and a transmitting method of a discovery signal that devices joining in device to device direct communication between devices broadcast with a radio channel so as to identify (discover) an adjacent device will be described.

1. Method of Configuring Discovery Signal

FIG. 1 is a diagram illustrating a structure of a discovery signal according to an exemplary embodiment of the present invention. A discovery signal for identifying (discovering) which devices joining in device to device direct communication between devices broadcast with a radio channel may have a format of FIG. 1.

The discovery signal includes a discovery type field (FD1) and an information field (FD2).

The FD1 may have a size of 1 bit. Specifically, when a discovery signal is a signal for discovering a device, the FD1 has a value of 0, and when a discovery signal is a signal for discovering a service, the FD1 has a value of 1.

The FD2 includes one of device identifier information (Device ID) and service related information according to a value of the FD1. Here, the Device ID is an identifier for distinguishing devices joining in direct communication, and may be a device identifier (e.g., a MAC address (48 bits) or a MAC address hash (24 bits)) that is used in an existing wideband-based system. Further, the service related information includes service type information, service ID information, service providing status information, and service providing related time information. Specifically, when a value of the FD1 is 0 (i.e., when a discovery signal is a signal for discovering a device), the FD2 includes Device ID, and when a value of the FD1 is 1 (i.e., when a discovery signal is a signal for discovering a service), the FD2 includes service related information. A device advertisement message which is a message for discovering a device, and a service advertisement service which is a message for discovering a service, have the same size. The device advertisement message or the service advertisement message is made with a discovery signal, which is a wireless signal, and is broadcasted through a radio channel.

For device discovery of other devices (e.g., D2) joining in direct communication, individual devices (e.g., D1) broadcast a discovery signal (discovery signal for discovering a device) that is formed with a device advertisement message including Device ID thereof. Specifically, the FD1 of a discovery signal for discovering a device represents a device advertisement message (e.g., having a value 0), and the FD2 of a discovery signal for discovering a device includes a Device ID of a corresponding device (e.g., D1). The individual device (e.g., D1) generates a device advertisement message as a discovery signal and broadcasts the device advertisement message through a radio channel.

In order for all devices joining in direct communication to discover a service that can be provided, individual devices (e.g., D1) broadcast a discovery signal (discovery signal for discovering a service) that is formed with a service advertisement message including service related information of a service that the individual devices provide. Specifically, the FD1 of a discovery signal for discovering a service represents a service advertisement message (e.g., having a value of 1), and the FD2 of a discovery signal for discovering a service includes service related information of a service that a corresponding device (e.g., D1) provides. As described above, the service related information may include service type information, service ID information, service providing status information, and service providing related time information. The service type information represents a service transmitting method (e.g., unicast, multicast, and broadcast) that a corresponding device (e.g., D1) provides. The service type information may be formed with 2 bits or 1 bit. When the service type information is formed with 2 bits, service type information may use a method of Table 1.

TABLE 1

Example of service type information use

| Value of service type information | Service transmitting method |
|---|---|
| 00 | Unicast transmission |
| 01 | Multicast transmission |
| 10 | Broadcast transmission |
| 11 | Reserved |

When service type information is formed with 1 bit, the service type information may be used with a method of Table 2.

TABLE 2

Another example of service type information use

| Value of service type information | Service transmitting method |
|---|---|
| 0 | Unicast transmission |
| 1 | Non-unicast transmission |

Service identifier information is an identifier for distinguishing services that are provided in a device to device direct communication system between devices, and may be an existing application ID or a hashed application ID that is extracted based on the application ID.

Service providing status information represents a status that a corresponding service is provided by a device (e.g., D1), and service providing related time information represents time information that is related to a service providing status. The service providing status may be formed with three steps (start, continue, and end), and service providing related time information according to each service providing status may be formed like Table 3.

TABLE 3

Example of service providing status and service providing related time information

| Service providing status | Service providing related time information |
|---|---|
| Start | (expected) start time |
| Continue | |
| End | (expected) end time |

When a service that a device (e.g., D1) provides is plural, a service advertisement message may include different service information at every transmitting time point. Further, when a size of service related information (e.g., service identifier information) of a specific service exceeds a size of an information field F2 of one service advertisement message, service related information of a corresponding service may be fragmented into a plurality of service advertisement messages to be continuously transmitted, and the fragmented service advertisement messages may be transmitted.

2. Method of Allocating Discovery Resource for Transmitting Discovery Signal

A discovery resource for transmitting a discovery signal in a wideband mobile wireless access-based direct communication system may be formed as follows.

When all radio resources are allocated using a multiple access method (e.g., an OFDMA method), devices joining in direct communication select a partial resource of a plurality of resources that are periodically allocated to transmit a discovery signal and transmit a discovery signal of each device using the selected discovery resource. A method in which a device transmits a discovery signal for discovering a device and a discovery signal for discovering a service using a discovery resource will be described with reference to FIGS. 2 to 6.

Figure 2:
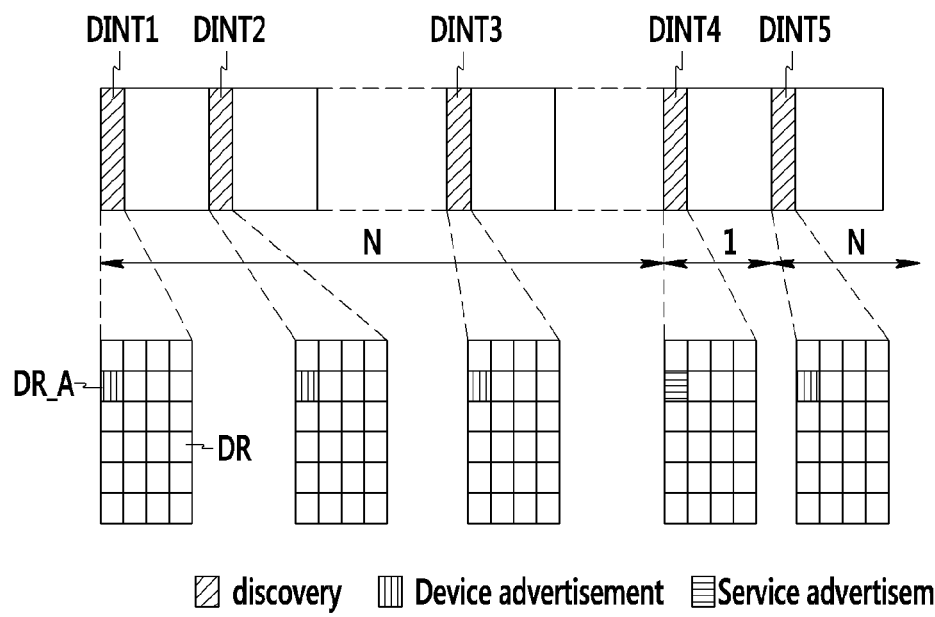
FIG. 2 is a diagram illustrating a method of transmitting a discovery signal using a resource of a fixed position according to an exemplary embodiment of the present invention.

FIG. 2 is a diagram illustrating a method of transmitting a discovery signal using a resource of a fixed position according to an exemplary embodiment of the present invention. Device ID and service related information may be connected (mapped) using position information of a discovery resource DR.

Each of discovery signal transmitting intervals DINT1-DINT5 includes a plurality of discovery resources DR. Each device joining in direct communication selects some of a plurality of discovery resources DR. The device (e.g., D1) transmits a discovery signal for discovering a device and for discovering a service using the selected resource (e.g., DR_A). FIG. 2 illustrates a case in which a device (e.g., D1) transmits a discovery signal for discovering a device and a discovery signal for discovering a service with an N:1 ratio (N is the natural number). That is, the device (e.g., D1) broadcasts a discovery signal that is formed with a device advertisement message using a resource (e.g., DR_A) of a fixed position at an Nth discovery signal transmitting interval (DINT1, DINT2, DINT3, . . . ). The device (e.g., D1) broadcasts a discovery signal that is formed with a service advertisement message using a resource (e.g., DR_A) of a fixed position at a first discovery signal transmitting interval DINT4.

Adjacent devices (e.g., D2) receive a discovery signal that the device (e.g., D1) transmits in a discovery resource area (e.g., DR_A) and determine whether the received discovery signal is a signal for discovering a device or a signal for discovering a service according to a value of a type information field F1 that is included in the received discovery signal. If the received discovery signal is a signal for discovering a device, the adjacent devices (e.g., D2) acquire Device ID from an information field F2 of the received discovery signal. The adjacent devices (e.g., D2) receive a discovery signal for discovering a service that is transmitted later through a resource (e.g., DR_A) of a fixed position that receives a discovery signal for discovering a device. If the received discovery signal is a signal for discovering a service, the adjacent devices (e.g., D2) acquire service related information from an information field F2 of the received discovery signal. By connecting Device ID and service related information that is acquired from a resource of a fixed position, the adjacent devices (e.g., D2) may determine a device that provides a corresponding service. FIG. 2 illustrates a case in which a transmitting ratio (hereinafter referred to as a "first transmitting ratio") of a discovery signal for discovering a device and a discovery signal for discovering a service is constant (N:1), but the first transmitting ratio may be varied. A case in which the first transmitting ratio is varied will be described with reference to FIG. 3.

Figure 3:
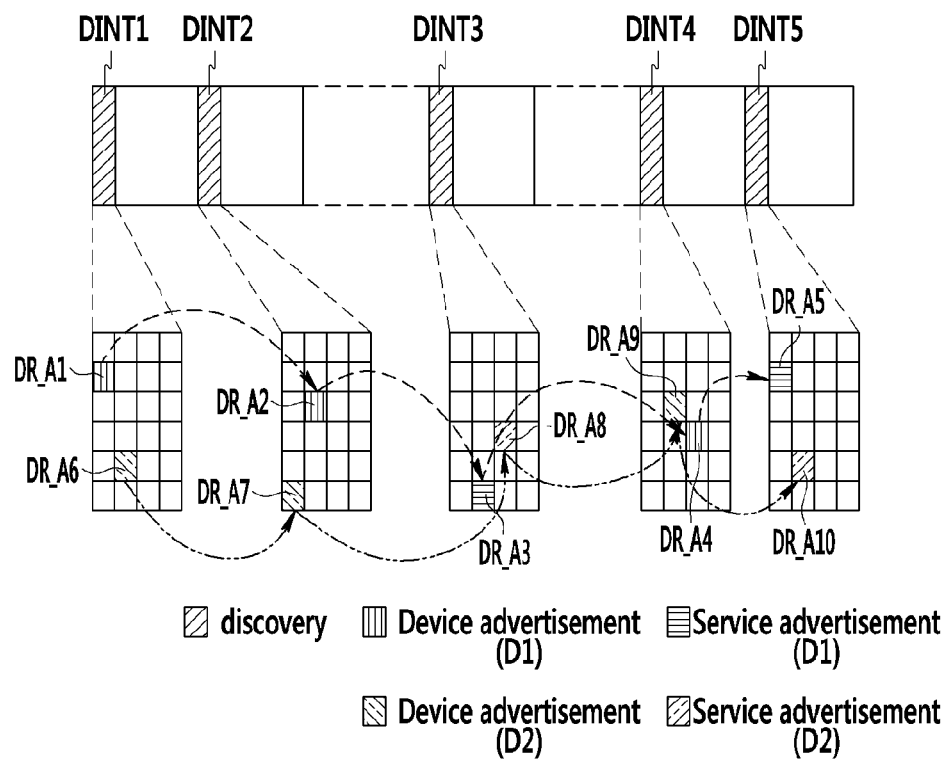
FIG. 3 is a diagram illustrating a method of transmitting a discovery signal using a resource allocation pattern according to an exemplary embodiment of the present invention.

FIG. 3 is a diagram illustrating a method of transmitting a discovery signal using a resource allocation pattern according to an exemplary embodiment of the present invention. Device ID and service related information may be connected (mapped) using a position of a determined resource according to a resource allocation pattern.

Each of discovery signal transmitting intervals DINT1-DINT6 includes a plurality of discovery resources.

In FIG. 3, it is assumed that information about a resource allocation pattern or a resource use pattern (e.g., hopping pattern) is already known to all devices joining in direct communication. As shown in FIG. 3, discovery resources DR_A1-DR_A5 that the device D1 uses change according to a corresponding resource use pattern. Similarly, discovery resources DR_A6-DR_A10 that the device D2 uses change according to a corresponding resource use pattern. Finally, because a corresponding resource use pattern is already known to devices joining in direct communication, the devices may connect (map) the received Device ID and the received service related information.

FIG. 3 illustrates a case in which a first transmitting ratio is variably changed by the devices D1 and D2 that transmit a signal. Specifically, the device D1 transmits a discovery signal that is formed with a device advertisement message twice using discovery resources DR_A1 and DR_A2, and transmits a discovery signal that is formed with a service advertisement message once using a discovery resource DR_A3. In this case, the first transmitting ratio is 2:1. The device D1 transmits a discovery signal that is formed with a device advertisement message once using a discovery resource DR_A4, and transmits a discovery signal that is formed with a service advertisement message once using a discovery resource DR_A5. In this case, the first transmitting ratio is 1:1. That is, FIG. 3 illustrates a case in which a first transmitting ratio of the devices D1 and D2 is changed from 2:1 to 1:1. Similarly, in FIG. 3, the first transmitting ratio of the device D2 is changed from 2:1 to 1:1. Specifically, the device D2 transmits a discovery signal for discovering a device twice using discovery resources DR_A6 and DR_A7, and transmits a discovery signal for discovering a service once using a discovery resource DR_A8. In this case, the first transmitting ratio is 2:1. The device D2 transmits a discovery signal for discovering a device once using a discovery resource DR_A9, and transmits a discovery signal for discovering a service once using a discovery resource DR_A10. In this case, the first transmitting ratio is 1:1.

Figure 4:
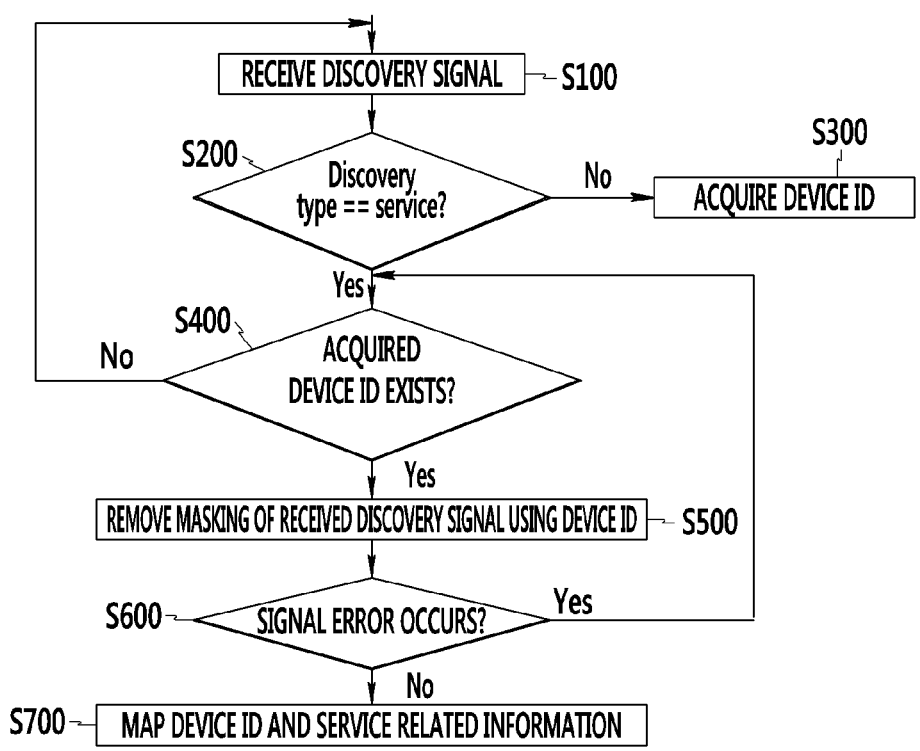
FIG. 4 is a flowchart illustrating a process of connecting Device ID and service information using masking according to an exemplary embodiment of the present invention.

FIG. 4 is a flowchart illustrating a process of connecting Device ID and service information using masking according to an exemplary embodiment of the present invention. A method of FIG. 4 is a method of connecting Device ID and service information using masking instead of using a discovery resource of a fixed position of FIG. 2 or a resource allocation pattern of FIG. 3.

A device (e.g., D1) joining in direct communication broadcasts a discovery signal that is formed with a device advertisement message through a radio channel using a discovery resource.

When the device (e.g., D1) transmits a discovery signal for discovering a service, the device (e.g., D1) masks an information field F2 using Device ID of the device (e.g., D1). The device (e.g., D1) transmits a discovery signal including masked service related information through a radio channel using a discovery resource.

Adjacent devices (e.g., D2) receive the discovery signal that the device (e.g., D1) transmits (S100).

The device D2 determines whether the received discovery signal is a signal for discovering a device or a signal for discovering a service according to a value of a type information field F1 of the received discovery signal (S200).

If the received discovery signal is a signal for discovering a device, the device D2 acquires Device ID from the information field F2 of the received discovery signal (S300).

If the received discovery signal is a signal for discovering a service, the device D2 determines whether already acquired Device ID of peripheral devices exists (S400). If already acquired Device ID of peripheral devices does not exist, the device D2 receives a newly transmitted discovery signal (S100). If already acquired Device ID of peripheral devices exists, the device D2 removes masking of the received discovery signal using the acquired Device ID (S500). The device D2 determines whether a signal error occurs in a masking removing process (S600), and if a signal error does not occur in the masking removing process, the device D2 acquires service related information that is included in the received discovery signal and maps Device ID when masking removal has succeeded and the acquired service related information (S700). If a signal error has occurred in a masking removing process (S600), the device D2 performs a masking removing process using other Device ID of the acquired Device ID. Finally, a method of FIG. 4 is a method of connecting Device ID that can appropriately remove masking of the received discovery signal and service related information of the received discovery signal.

Figure 5:
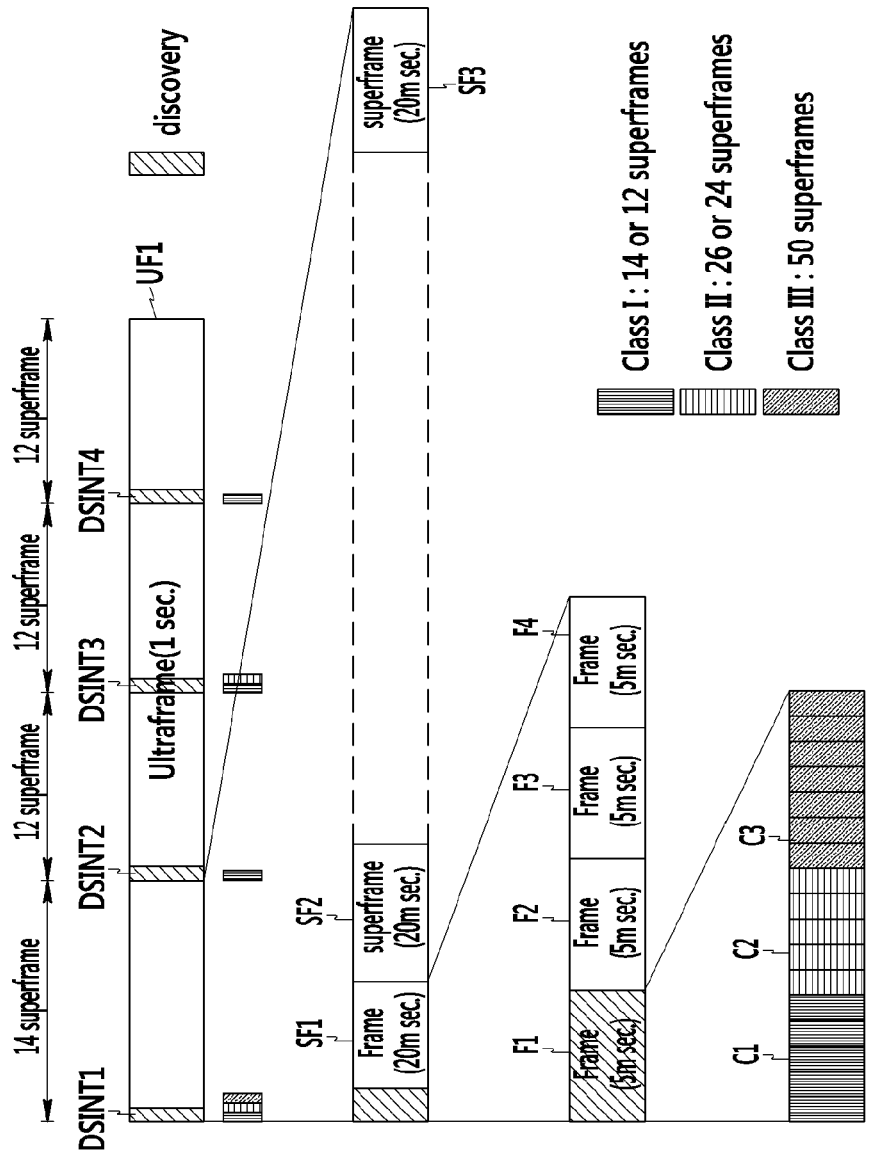
FIG. 5 is a diagram illustrating a configuration of a resource for transmitting a discovery signal according to an exemplary embodiment of the present invention.

FIG. 5 is a diagram illustrating a configuration of a discovery resource according to an exemplary embodiment of the present invention.

When all radio resources are allocated using a multiple access method (e.g., OFDMA), in consideration of mobility of a device, devices joining in direct communication may use a plurality of discovery resources that are periodically allocated as follows.

A plurality of discovery resources may be divided into P (P is a natural number) resource classes according to use. Each device selects some of discovery resources of a class that is allowed thereto and transmits a discovery signal using the selected resource. Here, the number P of resource classes may be determined according to requirements in a direct communication system. For convenience of description, FIG. 5 illustrates a case in which a plurality of discovery resources are divided into three resource classes.

In FIG. 5, it is assumed that a direct communication system operates in an ultraframe structure that is formed in a K cycle unit. The discovery resource may be provided in M intervals DSINT1-DSINT4 within a K cycle unit. Each of the discovery signal transmitting intervals DSINT1-DSINT4 is formed with an L time. A time interval between the discovery signal transmitting intervals DSINT1-DSINT4 is T. The discovery signal transmitting intervals DSINT1-DSINT4 include S discovery resources, and each device may select one resource of S discovery resources.

FIG. 5 illustrates a case in which K=1 s, M=4, L=5 ms, T=280 ms or 240 ms, and S=17. The ultraframe UF1 includes a plurality of superframes. FIG. 5 illustrates a case in which a gap between the discovery signal transmitting interval DSINT1 and the discovery signal transmitting interval DSINT2 corresponds to a 14 superframe length and in which a gap between the remaining discovery signal transmitting intervals DSINT2, DSINT3, and DSINT4 corresponds to a 12 superframe length. Each of superframes SF1, SF2, and SF3 may be formed with a time of 20 ms. Each of the superframes SF1, SF2, and SF3 includes a plurality of frames F1-F4, and FIG. 5 illustrates a case in which each of the superframes SF1, SF2, and SF3 includes four frames F1-F4. Each of the frames F1-F4 of the superframe SF1 may be formed with a time of 5 ms. FIG. 5 illustrates a case in which each of the discovery signal transmitting intervals DSINT1-DSINT4 has a time of 5 ms corresponding to one frame F1. Finally, in FIG. 5, the frame F1 includes 17 (=5 resources corresponding to resource class 1+5 resources corresponding to resource class 2+7 resources corresponding to resource class 3) resources C1, C2, and C3.

In FIG. 5, a resource corresponding to the resource class 1 is a resource available in a cycle of 280 ms or 240 ms, a resource corresponding to the resource class 2 is a resource available in a cycle of 520 ms or 480 ms, and a resource corresponding to the resource class 3 is a resource available in a cycle of 1 s. Devices having high mobility may use a resource of a resource class (e.g., resource class 1) having a short cycle, and devices having low mobility may use a resource of a resource class (e.g., resource class 3) having a long cycle.

A resource within the same resource class may be subdivided into a resource group. Specifically, a resource corresponding to the resource class 1 may be divided into one resource group, a resource corresponding to the resource class 2 may be divided into two resource groups, and a resource corresponding to the resource class 3 may be divided into four resource groups. The device selects only one discovery resource of one resource group within the selected resource class and periodically transmits a discovery signal using the selected discovery resource. Specifically, five devices may periodically use five resources C1, respectively, of a first resource group corresponding to the resource class 1 in each of the discovery signal transmitting intervals DSINT1-DSINT4. Other five devices may use five resources C2, respectively, of a 2-1 resource group corresponding to the resource class 2 of each of the discovery signal transmitting intervals DSINT1 and DSINT3 in a cycle of 520 ms. Further other five devices may use five resources C2, respectively, of a 2-2 resource group corresponding to the resource class 2 of each of the discovery signal transmitting intervals DSINT2 and DSINT4 in a cycle of 480 ms. Other seven devices may use seven resources C3, respectively, of a 3-1 resource group corresponding to the resource class 3 of the discovery signal transmitting interval DSINT1 in a cycle of 1 s. Further other seven devices may use seven resources C3, respectively, of a 3-2 resource group corresponding to the resource class 3 of the discovery signal transmitting interval DSINT2 in a cycle of 1 s. Further other seven devices may use seven resources C3, respectively, of a 3-3 resource group corresponding to the resource class 3 of the discovery signal transmitting interval DSINT3 in a cycle of 1 s. Further other seven devices may use seven resources C3, respectively, of a 3-4 resource group corresponding to the resource class 3 of the discovery signal transmitting interval DSINT4 in a cycle of 1 s. Finally, when the discovery resource is formed, as shown in FIG. 5, the maximum number of devices that can use a discovery resource within one ultraframe UF1 is 43 (=5+5*2+7*4).

Figure 6:
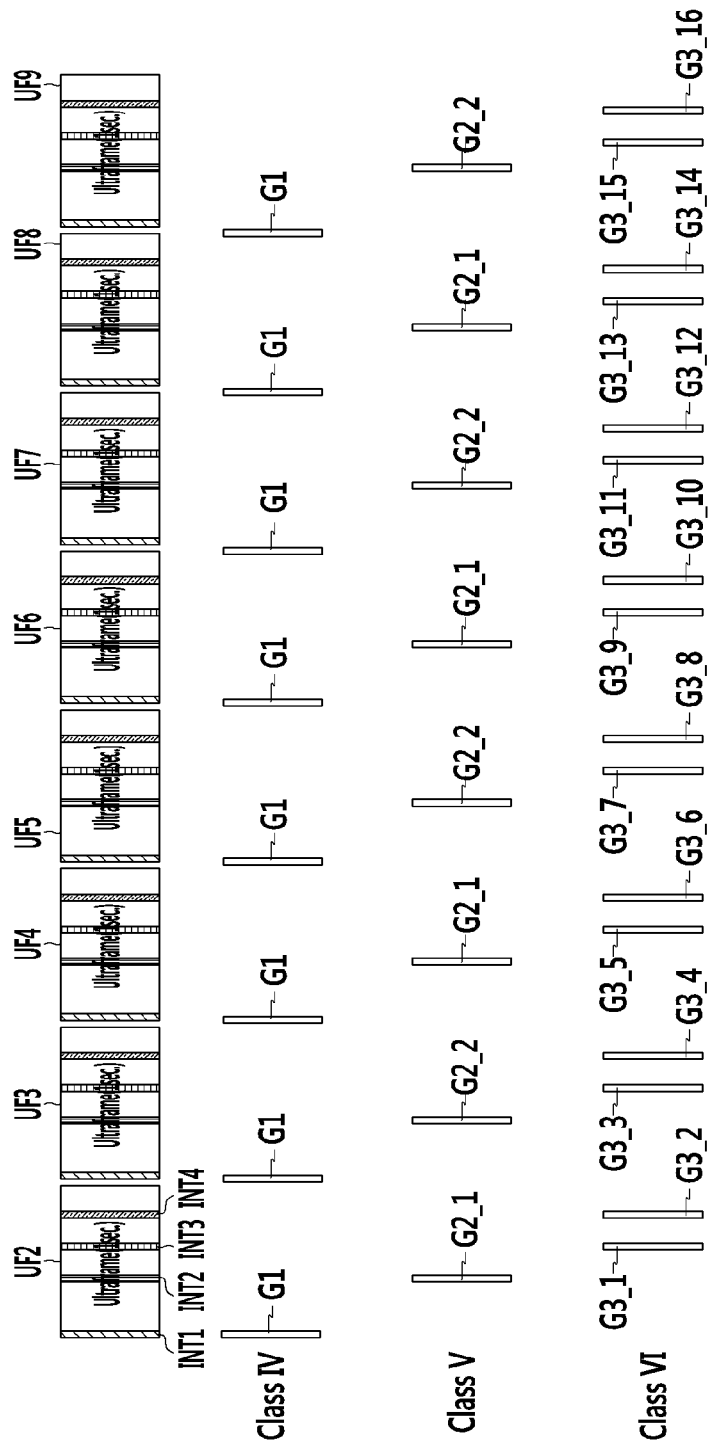
FIG. 6 is a diagram illustrating a configuration of a resource for transmitting a discovery signal according to another exemplary embodiment of the present invention.

FIG. 6 is a diagram illustrating a configuration of a discovery resource according to another exemplary embodiment of the present invention. FIGS. 5 and 6 are the same in frame structure and a detailed resource structure, and are different only in a configuration of a resource class. Specifically, FIG. 5 illustrates a case in which a resource corresponding to different resource classes is included within one discovery transmitting interval DSINT1-DSINT4, and FIG. 6 illustrates a case in which a resource corresponding to the same resource class is included within one discovery transmitting interval INT1-INT4.

Each of ultraframes UF2-UF9 includes four discovery transmitting intervals INT1-INT4.

In FIG. 6, a resource corresponding to a resource class 4 is a resource available in a cycle of 1 s (every ultraframe), a resource corresponding to a resource class 5 is a resource available in a cycle of 2 s (every two ultraframes), and a resource corresponding to a resource class 6 is a resource available in a cycle of 8 s (every eight ultraframes).

Discovery resources within each of the discovery transmitting intervals INT1-INT4 correspond to the same resource class. Specifically, in FIG. 6, 17 discovery resources within the discovery transmitting interval INT1 correspond to a resource class 4, 17 discovery resources within the discovery transmitting interval INT2 correspond to a resource class 5, 17 discovery resources within the discovery transmitting interval INT3 correspond to a resource class 6, and 17 discovery resources within the discovery transmitting interval INT4 correspond to a resource class 6.

In FIG. 6, a resource corresponding to the resource class 4 is divided into one resource group G1, a resource corresponding to the resource class 5 is divided into two resource groups G2_1 and G2_2, and a resource corresponding to the resource class 6 is divided into 16 resource groups G3_1-G3_16. Specifically, 17 devices may periodically use 17 resources, respectively, of the resource group G1. Other 17 devices may periodically use 17 resources, respectively, of the resource group G2_1. Other 17 devices may periodically use 17 resources, respectively, of the resource group G2_2. Other 17 devices may periodically use 17 resources, respectively, of the resource group G3_1. Similarly, other 15*17 devices may periodically use 17 resources, respectively, of 15 resource groups G3_2-G3_16. Finally, when the discovery resource is formed, as shown in FIG. 6, the maximum number of devices that can use a discovery resource within 8 ultraframes UF2-UF9 is 323 (=17+17*2+17*8+17*8).

3. Multicast Service Providing Method

A multicast service providing method to which the above-described discovery signal configuration and discovery signal transmitting method are applied will be described with reference to FIG. 7.

FIG. 7 is a diagram illustrating a multicast service providing process according to an exemplary embodiment of the present invention. A case in which a terminal D1 joining in device to device direct communication between terminals provides a multicast service to adjacent terminals D2, D3, and D4 is assumed.

First, the device D1 performs identification (discovery) of the devices D2 and D3 and recognizes that the device D1 is adjacent to the devices D2 and D3 (S1100).

The device D1 generates a service advertisement message including information about a service to newly provide into a discovery signal and transmits the discovery signal (S1200). In this case, a service type of the service advertisement message represents multicast transmission, service providing status information (status) represents a start, and service providing related time information (time) represents a start time of a service.

The devices D2 and D3 receive a discovery signal for discovering a service that the device D1 transmits. The devices D2 and D3 determine whether to receive a service of the device D1, and when receiving a service of the device D1, the devices D2 and D3 request multicast join to the device D1 (S1300). The devices D2 and D3 use a link setup request to request multicast join.

While the device D1, having received the multicast join request of the devices D2 and D3, transmits a link setup in response to the received multicast join request, the device D1 provides additional information (e.g., multicast group ID) necessary for receiving a corresponding service to the devices D2 and D3 (S1400). FIG. 7 illustrates a case in which adjacent devices D2 and D3 transmit a multicast join request to the device D1 that provides a service, but the device D1 that provides a service may directly request multicast join to the adjacent devices D2 and D3 after broadcasting a discovery signal for discovering a service.

When multicast join of the devices D2 and D3 is determined, the device D1 provides a multicast service at a service providing start time (S1500, S1600). The devices D2 and D3 joining in multicast determine resource information in which a corresponding service is provided using additional information (e.g., multicast group ID) that is provided upon allowing multicast join and receive the corresponding service.

The device D1 periodically broadcasts a discovery signal for discovering a device through a selected resource even while a service is provided (S2100). While the device D1 provides a multicast service, when a device D4 moves to a position adjacent to the device D1, the device D1 and the device D4 receive a discovery signal for discovering a device in which another party broadcasts and identify (discover) each other.

The device D1 broadcasts a discovery signal for discovering a service even while providing a service (S2200). In this case, a service type of a service advertisement message represents multicast transmission, and service providing status information (status) represents continue.

The device D4 receives a discovery signal for discovering a service that the device D1 broadcasts. The device D4 receives a service of the device D1 through the same processes S2300-S2600 as in the above-described service join processes S1300-S1600 of the devices D2 and D3.

When the device D1 wishes to stop a service, the device D1 notifies the devices D2, D3, and D4 joining in a service of service termination through a service advertisement message. In this case, a service type of a service advertisement message represents multicast transmission, service providing status information (status) represents end, and service providing related time information (time) represents an end time. The device D1 transmits a service advertisement message including service end information even to other devices (e.g., D5) that attempt service join other than the devices D2, D3, and D4, thereby controlling a service join request of other devices (e.g., D5).

According to an exemplary embodiment of the present invention, a discovery signal for service discovery as well as device discovery is transmitted using one wireless resource form before setting a communication path between devices joining in direct communication on a radio resource. Thereby, because a service can be discovered without an increase in overhead when using a radio resource, unnecessary communication path setting can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a first mobile device joining in device to device direct communication transmits a discovery signal, the method comprising:
    transmitting a first discovery signal for discovering a device using at least one of a plurality of discovery resources in one of a plurality of discovery frames for device or service discovery included in an ultraframe, each discovery frame including a plurality of discovery resources that belong to a same resource class of a plurality of resource classes, the plurality of resource classes being periodically available with different cycles, each of the cycles being no smaller than a cycle of the ultraframe; and
    transmitting a second discovery signal for discovering a service using the ultraframe, wherein
    the first and second discovery signals have a same format, and each include
        a first field representing whether the first discovery signal is a signal for discovering a device or a signal for discovering a service, and
        a second field comprising one of device identifier information (Device ID) of the first mobile device and service information of a service that the first mobile device provides according to a value of the first field, and
    a time interval between each of the plurality of discovery frames corresponds to a length of a plurality of superframes.

2. The method of claim 1, wherein the second discovery signal is transmitted via the at least one discovery resource.

3. The method of claim 2, wherein a position of the at least one discovery resource in each period is constant.

4. The method of claim 3, wherein
    the transmitting of a first discovery signal comprises periodically broadcasting the first discovery signal N times using the at least one discovery resource, and
    the transmitting of a second discovery signal comprises periodically broadcasting the second discovery signal M times using the at least one discovery resource after the first discovery signal is broadcasted N times, N and M each being a natural number.

5. The method of claim 1, wherein the at least one discovery resource is a resource of a determined position according to a hopping pattern.

6. The method of claim 5, wherein the transmitting of a second discovery signal comprises
    periodically broadcasting the second discovery signal M times after the first discovery signal is periodically broadcasted N times, and
    N and M are each a natural number, and are varied.

7. The method of claim 1, wherein the transmitting of a second discovery signal comprises:
    masking the service information using the Device ID;
    inserting the masked service information into the second field; and broadcasting the second discovery signal through a radio channel.

8. A method in which a first mobile device joining in direct communication receives a discovery signal, the method comprising:

receiving the discovery signal transmitted via at least one of a plurality of discovery resources in one of a plurality of discovery frames for device or service discovery included in an ultraframe, each discovery frame including a plurality of discovery resources that belong to a same resource class of a plurality of resource classes, the plurality of resource classes being periodically available with different cycles, each of the cycles being no smaller than a cycle of the ultraframe;

determining whether the discovery signal is a signal for discovering a device or a signal for discovering a service based on a value that is stored at a first field of the received discovery signal;

acquiring, when the discovery signal is a signal for discovering a device, device identifier information (Device ID) that is stored at a second field of the discovery signal; and acquiring, when the discovery signal is a signal for discovering a service, service information that is stored at the second field of the discovery signal, wherein the discovery signal comprises:

the first field representing whether the discovery signal is a signal for discovering a device or a signal for discovering a service; and the second field comprising one of the Device ID of a device that transmits the discovery signal and the service information of a service that a device that transmits the discovery signal provides according to a value of the first field, and a time interval between each of the plurality of discovery frames corresponds to a length of a plurality of superframes.

9. The method of claim 8, further comprising unmasking the acquired service information using the acquired Device ID.

10. The method of claim 1, wherein the service information comprises:

service type information representing a type of the service;

service identifier information of the service;

service status information representing a providing status of the service; and time information that is related to the service status information.

11. The method of claim 10, wherein the service type information represents one of unicast transmission, multicast transmission, and broadcast transmission.

12. The method of claim 10, wherein the service status information represents one of a start status of the service, a continue status of the service, and an end status of the service, and the time information represents a start time of the service when the service status information represents the start status, and the time information represents an end time of the service when the service status information represents the end status.

13. The method of claim 1, further setting a direct communication path on a radio channel after the service is discovered.

14. The method of claim 8, further setting a direct communication path on a radio channel after the service is discovered.

15. The method of claim 1, wherein at least one of the cycles of the resource classes is larger than the cycle of the ultraframe.

16. The method of claim 8, wherein at least one of the cycles of the resource classes is larger than the cycle of the ultraframe.

* * * * *